Jan. 7, 1969   KENZO OKABE   3,420,122
INFINITELY VARIABLE FRICTION DRIVE
Filed Sept. 26, 1966
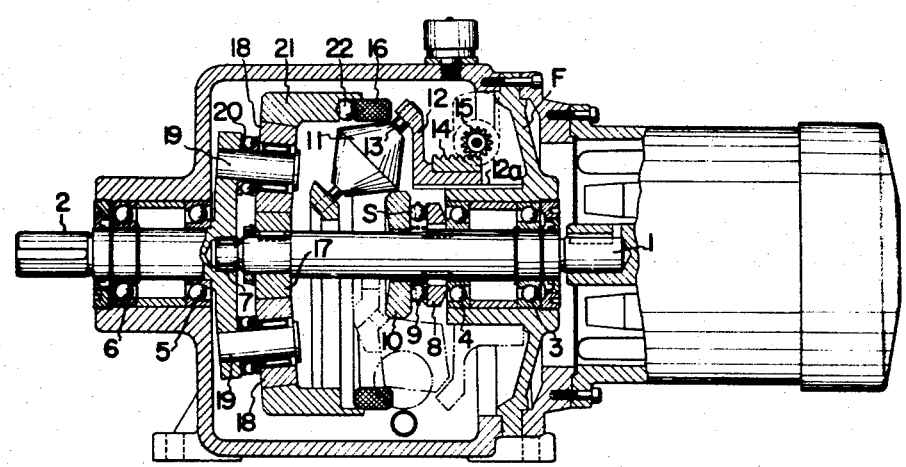

United States Patent Office 3,420,122
Patented Jan. 7, 1969

3,420,122
INFINITELY VARIABLE FRICTION DRIVE
Kenzo Okabe, 43 Hiroike-machi, Showa-ku,
Nagoya-shi, Aichi-ken, Japan
Filed Sept. 26, 1966, Ser. No. 581,788
Claims priority, application Japan, Nov. 11, 1965,
40/69,309
U.S. Cl. 74—796                                    4 Claims
Int. Cl. F16h 15/50

ABSTRACT OF THE DISCLOSURE

A planetary differential type infinitely variable friction device having coaxial input and output shafts and a driving disc for transmitting the rotation of the input shaft. A plurality of intermediate power transmitting double cone rollers are supported obliquely respecting the input shaft and are adapted to roll with frictional contact relative to the disc and to be movable in the axial direction of the input and output shafts. An outer conical ring is disposed around and in rolling contact with the outer surfaces of the double cone rollers for receiving power by friction. A plurality of planet friction cone rollers are rotatably mounted on planet shafts supported on the output shaft. The planet cone rollers are in rolling frictional contact with an internal surface of the conical ring and a sun cone roller fixed to the input shaft is disposed in rolling contact with the planet cone rollers.

---

This invention relates to infinitely variable friction drives and more particularly to a new variable-speed drive wherein a planetary differential mechanism is constituted by the addition of a planetary friction roller mechanism to an infinitely variable friction mechanism of known type having coaxially aligned input and output shafts.

It is an object of the present invention to provide an infinitely variable friction drive in which not only is the output speed steplessly reduced through forward rotation speeds and beyond zero speed (stopped state) and changed into reverse rotation speeds, but particularly in forward rotation a large output torque is produced even at the nearly zero speeds.

Another object of the invention is to provide an infinitely variable friction drive capable of operating with a high power transmission efficiency equivalent to or surpassing that of gear type planetary mechanisms, without vibration such as that produced by gear mechanisms.

Still another object of the invention is to provide an infinitely variable friction drive which can be fabricated very easily and at low cost because the drive is constructed very simply, strongly, and has no complicated parts.

According to the present invention, briefly stated, there is provided an infinitely variable friction drive having input and output shafts coaxially in alignment, characterized by the combination of: a driving disk for transmitting the rotation of the input shaft; a plurality of intermediate power transmitting double cone rollers supported obliquely with respect to the input shaft and adapted to roll with frictional contact relative to said driving disk and to be movable in the axial direction of the input and output shafts; an outer conical ring disposed around and in rolling contact with the outer peripheral surfaces of said double cone rollers to receive power by friction therefrom; a plurality of planet friction cone rollers rotatably fitted on respective planet shafts supported on the output shaft, with said planet cone rollers being in rolling frictional contact with an internal circular surface of said conical ring; and a sun cone roller fixed to the input shaft and disposed in rolling contact with said planet cone rollers.

A feature of the infinitely variable friction drive according to the invention is that, the extensions of the contact surface of the sun cone roller, the contact surfaces and shafts of the planet friction cone rollers, and the inner contact surface of the conical ring all intersect geometrically at one point on the extension of the sun cone roller axis, whereby contacts between the rollers of the planetary friction cone roller mechanism are line contacts. Accordingly, positive rolling movements are produced, and there is no spinning, no power loss and no wear of the rolling surfaces.

Another feature of the invention is that the contact pressures between the contacting rollers of the planetary friction mechanism are regulated automatically by a pressure device for regulating the applied pressure in proportion to the driving power being transmitted.

The most unique feature of the invention is that the contact forces are almost all directed in the radial direction and that the axial thrust forces which produce the contact forces nullify each other, whereby negligible thrust force is imparted to the shaft bearings. Thus, the power loss of this drive is very small, and the efficiency is very high.

The nature, principle, and details of the invention will be more clearly apparent from the following detailed description with respect to a preferred embodiment of the invention, when read in conjunction with the accompanying drawing.

In the drawing, the single figure is a side view, partly in longitudinal section and partly in elevation, showing an infinitely variable friction drive of a double-cone friction roller type embodying the invention.

Referring to the drawing, the infinitely variable friction drive of double-cone friction roller type shown therein has an input shaft 1 and an output shaft 2 both disposed coaxially on the same axis and respectively supported on ball bearings 3, 4, 5, and 6, with the forward output end (i.e., the left-hand end as viewed in the drawing) of the input shaft being rotatably supported on a needle bearing 7 provided at the inner or rear end of the output shaft 2.

A disk 8 key-locked and firmly press-fitted to the input shaft 1, a driving disk 10 rotatably fitted on the input shaft 1, and steel balls 9 held between the disks 8 and 10 constitute a coupling and, together with a spring S inserted between the two disks, function to regulate applied pressure which produces frictional force in proportion to the transmitted torque.

A number of double cone rollers, for example, three double cone rollers 11 each having a double-cone shape, are disposed with a planetary relationship around a supporting structure (so-called carrier or spider) 12 and are provided with respective spindles 13 each of which is rotatably supported. Each spindle 13 is disposed at a certain oblique angle relative to the axis of the input shaft 1. The carrier 12 is capable of moving translationally in only the longitudinal axis direction, being guided by a key and key way $12_a$ provided in a part of a stationary end cover F of the device, and being driven through a pinion 15 and a rack 14. Accordingly, the friction double-cone rollers 11 can move translationally in only the longitudinal axial direction.

The double-cone rollers 11, on one hand, are frictionally engaged with the aforementioned driving disk 10 and, on the other hand, are frictionally engaged with the inner contact surface of an outer ring 16.

On one hand, the input shaft 1, at its extension, rotationally drives a sun-cone roller 17 key-locked thereto. Around the peripheral surface of the sun-cone roller 17, there are arranged at least three planet friction cone rollers 18 in circumferentially equally spaced disposition. The planet cone rollers 18 are rotatably supported on respective planet shafts 19 and, at the same time, are frictionally engaged with the conical working surfaces of the sun-cone roller 17 and a conical ring 21.

The rear end surface of the conical ring 21 and the front end surface of the outer ring 16 face each other and are provided with recesses having inclined surfaces receiving steel balls 22 retained in a ball-bearing cage. Thus, the conical ring 21 and outer ring 16, together with the steel balls 22, constitute a coupling for regulating applied pressure. Since this pressure device consisting essentially of the conical ring 21, outer ring 16, and the steel balls 22 and the aforementioned pressure device consisting essentially of the disk 8, the driving disk 10, and the steel balls 9 are both capable of imparting frictional forces at the contact points in proportion to the transmitted power, they function to reduce power losses.

Of the reaction of the axial thrust forces to produce the contact pressures between the driving members, one axial thrust force is due to the double cone side, and the other axial thrust force is due to the planetary cone side. Consequently, both thrust forces tend to nullify each other within the input shaft, and almost no thrust force is transmitted to the input shaft bearings. Thus, power loss due to the axial thrust forces can be neglected.

The variable-speed drive of the above described construction and arrangement according to the invention operates in the following manner. When the carrier 12 is moved in the longitudinal axial direction, the contact points between the double cone rollers 11 and the driving disk 10 and the contact points between the double cone rollers 11 and the outer ring 16 are simultaneously changed. Since the rotational speed of the input shaft 1 and the rotational speed of the outer ring 16 and conical ring 21 are changeable, the planet rollers 18 revolve around the axis of the output shaft as these planet rollers 18 rotate about their respective planet shafts 19, and power is transmitted with the desired speed reduction to the output shaft 2.

The rotational speed of the output shaft 2 can be determined from the following equations.

The value of the speed change ratio K due to a movement of the double cone rollers in the longitudinal axial direction is approximately from 3.5 to 1/3.5. The rotational speed $n_0$ (in revolutions per minute) of the output shaft in the drive of the above described construction and arrangement can be determined from the following equation.

$$n_0 = n \frac{S_2 - K \frac{S_1}{R_1} R_2}{R_2 + S_2}$$

where:

$n$ is the input shaft speed in r.p.m.;
$S_1$ is the first sun roller diameter, which is equal to the diameter of the driving disk 10;
$R_1$ is the inner diameter of the first ring, which is equal to the inner diameter of the contact surface of outer ring 16;
$S_2$ is the second sun roller diameter, which is equal to the diameter of sun roller 17;
$R_2$ is the inner diameter of the second ring, which is equal to the inner diameter of the contact surface of conical ring 21; and
$K$ is the speed-change ratio due to double cone rollers 11.

Note: Strictly speaking, $R_2$ and $S_2$ are cone angle ratios.

When, in practice, the relationships $R_2 = 2S_2$ and $R_1 = 2S_1$ are assumed, the following equation is obtained.

$$n_0 = \frac{n}{3}(1-K)$$

As the value of K is from 1/3.5 to 3.5, the rotational speed of the output shaft can be changed steplessly from $n/4.2$, beyond zero, to $-n/1.2$.

An advantageous feature of the variable-speed drive of the invention is that, when forward rotation is to be used, although the maximum rotational speed is reduced, since the circulating power is transmitted through the extremely powerful combination of the sun roller 17 and planet friction rollers 18, a high torque can be produced in the output.

Furthermore, while almost no torque could be produced in conventional variable speed drives having a similar function at low rotational speeds just before stoppage (zero speed), the variable-speed drive of the present invention is capable of producing an extremely high torque since it comprises a planetary differential mechanism made up of elements in which the planet rollers 18 always have high torque. Thus, another advantageous feature of the drive of the invention is that, when it is started from rest, it is possible to start readily into motion an extremely large massive machine.

Still other advantageous features of the drive of the invention are that, in comparison with conventional variable-speed drives of like type, the number of essential parts is extremely small, there being, moreover, no parts which are difficult to fabricate, and that the drive of the invention can be produced with substantially smaller size and lower weight than known drives of similar capacity, whereby the production cost of the drive of the invention is extremely low.

A further advantageous feature of the present invention resides in the use of cone rollers, instead of gears, in the planetary mechanism to accomplish a positive rolling action and in the utilization of a frictional planetary mechanism in which the frictional force is automatically regulated in proportion to the driving power, whereby a further reduction in production cost is attained, and vibration and meshing noise such as that which would be produced by a gear drive are eliminated.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What I claim is:

1. A planetary differential type infinitely variable friction device comprising input and output shafts in coaxial alignment, friction rollers provided with double conical circumferential surfaces which contact the running surfaces, the circumferential surfaces being inclined to the axis of the running surfaces and the running surfaces being staggered to each other in the direction of their common axis so that the bearing pressures of the friction rollers produced by the contact pressure are at least partly compensated for each other, a driving disc for transmitting rotation of the input shaft, intermediate double cone rollers supported obliquely respecting said input shaft and adapted to roll in the state of frictional conatact with the driving disc and adapted to be movable in the axial direction of the input and output shafts, and an outer ring which rolls in the state of frictional contact with the outer peripheral surface of the double cone rollers, the improvement comprising a ring provided concentrically with respect to the input shaft and adapted to constitute a pressure device together with said outer ring, planet shafts supported on the output shaft positioned in the same axial line as that of the input shaft, planet friction cone rollers rotatably supported on said respective planet shafts and being in frictional contact with the internal surface of said ring, and a sun cone roller supported by the input shaft and engaged frictionally with said planet friction cone rollers.

2. The infinitely variable friction device as claimed in claim 1, in which each of the friction rollers is of a double-cone shape consisting of two cones joined base-to-base.

3. The infinitely variable friction drive as claimed in claim 1, in which extensions of the contact surface of the sun cone roller, the contact surfaces and shafts of the planet friction cone rollers, and the inner contact surface of the ring all intersect geometrically at one point on the extension of the axis of the sun cone roller.

4. The infinitely variable friction drive as claimed in claim 1, in which the axial thrust forces which produce the contact pressures between the rolling contacts nullify each other and thereby impart no effect to outside bearings supporting the input and output shafts.

References Cited

UNITED STATES PATENTS

| | | | |
|---|---|---|---|
| 2,164,504 | 7/1939 | Dodge | 74—796 X |
| 2,883,883 | 4/1959 | Chillson | 74—796 X |
| 2,886,986 | 5/1959 | Kopp | 74—796 |
| 3,283,614 | 11/1966 | Hewko | 74—798 |

ARTHUR T. McKEON, *Primary Examiner.*

U.S. Cl. X.R.

74—190

UNITED STATES PATENT OFFICE
CERTIFICATE OF CORRECTION

Patent No. 3,420,122  January 7, 1969

Kenzo Okabe

It is certified that error appears in the above identified patent and that said Letters Patent are hereby corrected as shown below:

In the heading to the printed specification, lines 3 and 4, "43 Hiroike-machi, Showa-ku, Nagoya-shi, Aichi-ken, Japan" should read -- Nagoya-shi, Aichi-ken, Japan, assignor to Asahi Seiki Kogyo Kabushiki Kaisha, Higashikasugai-Gun, Aichi-ken, Japan, a joint-stock company of Japan --.

Signed and sealed this 7th day of April 1970.

(SEAL)
Attest:

Edward M. Fletcher, Jr.

Attesting Officer

WILLIAM E. SCHUYLER, JR.

Commissioner of Patents